United States Patent
Hillier et al.

(10) Patent No.: US 10,288,430 B2
(45) Date of Patent: May 14, 2019

(54) METHOD AND SYSTEM FOR PRODUCING A VECTOR MAP

(71) Applicant: Siemens Aktiengesellschaft, Munich (DE)

(72) Inventors: Gernot Hillier, Landshut (DE); Rupert Maier, Eggolsheim (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 36 days.

(21) Appl. No.: 15/110,834

(22) PCT Filed: Nov. 10, 2014

(86) PCT No.: PCT/EP2014/074138
§ 371 (c)(1),
(2) Date: Jul. 11, 2016

(87) PCT Pub. No.: WO2015/110195
PCT Pub. Date: Jul. 30, 2015

(65) Prior Publication Data
US 2016/0341554 A1    Nov. 24, 2016

(30) Foreign Application Priority Data
Jan. 23, 2014   (DE) .................. 10 2014 201 238

(51) Int. Cl.
*G01C 21/00*    (2006.01)
*G01C 11/02*    (2006.01)
(Continued)

(52) U.S. Cl.
CPC .......... *G01C 21/005* (2013.01); *B64C 39/024* (2013.01); *G01C 11/02* (2013.01);
(Continued)

(58) Field of Classification Search
CPC .................................................. G01C 21/005
See application file for complete search history.

(56) References Cited

U.S. PATENT DOCUMENTS

| | | | | |
|---|---|---|---|---|
| 6,421,610 B1 * | 7/2002 | Carroll | ............. | G06F 17/30241 702/5 |
| 7,787,659 B2 * | 8/2010 | Schultz | ................. | G01C 11/02 348/144 |

(Continued)

FOREIGN PATENT DOCUMENTS

| | | | | |
|---|---|---|---|---|
| AU | 621584 B2 | 3/1992 | ............. | G01C 11/02 |
| EP | 0325957 A1 | 8/1989 | ............. | G01C 11/02 |

(Continued)

OTHER PUBLICATIONS

European Office Action, Application No. 14801960.7, 6 pages, dated Jul. 7, 2017.

(Continued)

*Primary Examiner* — Hussein Elchanti
*Assistant Examiner* — Michael A Berns
(74) *Attorney, Agent, or Firm* — Slayden Grubert Beard PLLC (57) ABSTRACT

A method for producing a vector map of a prescribed area may include producing orthophotographs by a first camera oriented at right angles to the Earth's surface and fitted to an unmanned, automated air vehicle that overflies the prescribed area at a high altitude; evaluating the orthophotographs to ascertain at least one infrastructure network located in the area; computing a flight route for the unmanned autonomous air vehicle along the ascertained infrastructure network located in the area; producing detail aerial photographs of the infrastructure network along the computed flight route by a second camera oriented obliquely with respect to the Earth's surface and fitted to the unmanned automated air vehicle that overflies the infrastruc- (Continued)

ture network located in the area at least one low altitude, and computing the vector map of the area based on the orthophotographs produced and the detail aerial photographs.

16 Claims, 2 Drawing Sheets

(51) Int. Cl.
*G01C 21/32* (2006.01)
*B64C 39/02* (2006.01)
*G01C 11/04* (2006.01)
*G05D 1/00* (2006.01)
*G05D 1/08* (2006.01)
*G06T 11/60* (2006.01)
*G08G 5/00* (2006.01)

(52) U.S. Cl.
CPC .............. *G01C 11/04* (2013.01); *G01C 21/32* (2013.01); *G05D 1/0022* (2013.01); *G05D 1/0038* (2013.01); *G05D 1/0808* (2013.01); *G06T 11/60* (2013.01); *G08G 5/0013* (2013.01); *G08G 5/0034* (2013.01); *B64C 2201/123* (2013.01); *B64C 2201/127* (2013.01); *B64C 2201/141* (2013.01); *B64C 2201/146* (2013.01); *G06T 2207/20212* (2013.01)

(56) References Cited

U.S. PATENT DOCUMENTS

| 7,995,799 | B2* | 8/2011 | Schultz ................. G01C 11/02 348/143 |
|---|---|---|---|
| 8,531,472 | B2* | 9/2013 | Freund .................. G06T 11/001 345/581 |
| 9,275,406 | B2* | 3/2016 | Kulumani ............. G06Q 30/06 |
| 9,372,081 | B2* | 6/2016 | Isaksson ................ G01C 11/06 |
| 9,612,598 | B2* | 4/2017 | Schultz ................. G05D 1/0094 |
| 9,798,928 | B2* | 10/2017 | Carr ..................... G06K 9/0063 |
| 9,836,882 | B2* | 12/2017 | Freund .................. G06T 11/001 |
| 2008/0059065 | A1 | 3/2008 | Strelow et al. ............... 701/448 |
| 2009/0141020 | A1* | 6/2009 | Freund .................. G06T 11/001 345/419 |
| 2010/0020074 | A1 | 1/2010 | Taborowski et al. ......... 345/420 |
| 2010/0074538 | A1* | 3/2010 | Mishra ................. G06K 9/6286 382/224 |
| 2011/0290937 | A1 | 12/2011 | Salkeld ........................... 244/80 |
| 2012/0200703 | A1 | 8/2012 | Nadir et al. .................. 348/144 |
| 2013/0235199 | A1 | 9/2013 | Nixon ........................... 348/144 |
| 2016/0229533 | A1* | 8/2016 | van Cruyningen ... B64C 31/024 |
| 2016/0232792 | A1* | 8/2016 | van Cruyningen ... B64C 39/024 |
| 2017/0193694 | A1* | 7/2017 | Freund .................... G06T 17/05 |

FOREIGN PATENT DOCUMENTS

| ES | 2390441 A1 | 11/2012 | ............ B64C 39/02 |
|---|---|---|---|
| WO | 2015/110195 A1 | 7/2015 | ............ B64C 39/02 |

OTHER PUBLICATIONS

German Office Action, Application No. 102014201238.4, 5 pages, dated Dec. 2, 2014.
International Search Report and Written Opinion, Application No. PCT/EP2014/074138, 16 pages, dated Feb. 18, 2015.

* cited by examiner

METHOD AND SYSTEM FOR PRODUCING A VECTOR MAP

CROSS-REFERENCE TO RELATED APPLICATIONS

This application is a U.S. National Stage Application of International Application No. PCT/EP2014/074138 filed Nov. 10, 2014, which designates the United States of America, and claims priority to DE Application No. 10 2014 201 238.4 filed Jan. 23, 2014, the contents of which are hereby incorporated by reference in their entirety.

TECHNICAL FIELD

The invention relates to a method and a system for producing a vector map of a prescribed area using an unmanned automated aircraft.

BACKGROUND

Routing of vehicles requires digital map data. These map data may be available in a vector data format. Vector data in corresponding vector models describe space-related objects on the basis of points or nodes and also lines or edges. Vector data are therefore specified by means of coordinates and connections. These connections can reproduce the topology of an infrastructure network, particularly of a road network or traffic network. In this case, the vector data are conventionally enriched with relevant supplementary data or attribute data that are relevant to routing. Examples of such supplementary data are road names, road types, turn restrictions, signposts and a maximum speed permitted on a road. The vector data can be taken as a basis for computing a route for a vehicle, with position finding for the vehicle, for example by means of a GPS system, being able to be used to identify the current position of the vehicle. By comparing the currently recorded position of the vehicle and the computed route, it is possible to determine a deviation in the vehicle from the predefined route and to direct or steer the vehicle as appropriate directly or indirectly via the user. Meaningful navigation of a vehicle, particularly in a traffic network, requires relatively accurate data and a sufficient volume of supplementary or attribute data.

Besides navigation for individual vehicles, the digital map data can also be used for route planning for a vehicle fleet including many vehicles. In addition, the digital map data can also be used for directly controlling autonomously driving vehicles. Further, such digital map data can also be used for coordinating supporting measures in emergency areas.

Conventional methods for producing vector data that comprise digital map data involve the data being obtained from orthophotographs and updated. Orthophotographs are distortion-free true-to-scale depictions of the Earth's surface that are able to be derived from aerial or satellite images. The attribute or supplementary data required for the digital map data or the vector map are conventionally ascertained by traveling along the various possible routes, i.e. the attribute data are captured in situ by people involved in the project. Traveling along the routes usually involves video recordings being made by means of a camera, said video recordings being subsequently examined and manually evaluated in order to obtain the necessary attribute data or supplementary data. Therefore, capture of the supplementary or attribute data via the vector map is extremely laborious and time-consuming. Furthermore, manual evaluation of the video recordings or direct in-situ capture can easily involve errors or inaccuracies arising. One reason is the use of different cameras with different camera perspectives and inaccurate organization or association of the data on account of measurement at different times. In order to keep the map material up to date, regular inspections and corrections are required that in turn entail a high level of handling complexity.

SUMMARY

One embodiment provides a method for producing a vector map of a prescribed area having the following steps: production of orthophotographs by a first camera that is oriented at right angles to the Earth's surface and that is fitted to an unmanned, automated aircraft that overflies the prescribed area at a high altitude; evaluation of the orthophotographs in order to ascertain at least one infrastructure network located in the area; computation of a flight route for the unmanned autonomous aircraft along the ascertained infrastructure network located in the area; production of detail aerial photographs of the infrastructure network along the computed flight route by a second camera that is oriented obliquely with respect to the Earth's surface and that is fitted to the unmanned automated aircraft that overflies the infrastructure network located in the area at least one low altitude; and computation of the vector map of the area on the basis of the orthophotographs produced and the detail aerial photographs produced.

In one embodiment, attribute data are extracted from the detail aerial photographs produced for the infrastructure network and georeferenced.

In one embodiment, nodes and/or edges of the infrastructure network presented in the orthophotographs are provided with the georeferenced attribute data.

In one embodiment, the nodes and edges provided with attribute data are compiled to form the vector map of the area.

In one embodiment, the orthophotographs produced at the high altitude have distortion eliminated and are georeferenced.

In one embodiment, the orthophotographs and/or the detail aerial photographs are each produced in different spectral frequency ranges.

In one embodiment, the infrastructure network is a traffic network, particularly a road or rail network, or a supply network, particularly a power supply network or water supply network.

Another embodiment provides an unmanned autonomous aircraft for providing aerial photographs for producing a vector map of a prescribed area, having: a first camera that is oriented essentially at right angles to the Earth's surface and that delivers orthophotographs of the prescribed area at a high altitude of the aircraft; and a second camera that is oriented obliquely with respect to the Earth's surface and that delivers detail aerial photographs of an infrastructure network located in the prescribed area along a computed flight route at a low altitude; wherein the flight route of the unmanned automated aircraft along the infrastructure network is computed automatically on the basis of the orthophotographs delivered by the first camera.

In one embodiment, the unmanned automated aircraft has a computation unit that computes the flight route along the infrastructure network located in the area on the basis of the orthophotographs delivered by the first camera.

In one embodiment, the unmanned automated aircraft has a communication interface that the unmanned automated aircraft uses to wirelessly communicate with a base station bidirectionally.

In one embodiment, the base station has a computation unit that evaluates the orthophotographs received via the communication interface of the unmanned automated aircraft in order to compute a flight route along the infrastructure network and transmits the computed flight route to the unmanned automated aircraft.

In one embodiment, the unmanned automated aircraft has a GPS unit for recording a current position of the aircraft over the area and for georeferencing the orthophotographs and detail aerial photographs delivered by the two cameras, and an altitude measuring unit for recording the altitude of the aircraft.

In one embodiment, the unmanned automated aircraft has a flight control unit, which steers the unmanned automated aircraft along the computed flight route over the area, and a rotor drive unit that is actuated by the flight control unit.

In one embodiment, the computation unit of the unmanned automated aircraft or of the base station connected via the communication interface of the unmanned automated aircraft extracts attribute data from the detail aerial photographs delivered at the low altitude by the second camera and georeferences said attribute data.

In one embodiment, the computation unit of the unmanned automated aircraft or of the base station connected via the communication interface of the unmanned automated aircraft provides the nodes and/or edges of the infrastructure network that are presented in the orthophotographs with the attribute data extracted from the detail aerial photographs and georeferenced and compiles the nodes and/or edges provided with the attribute data to form the vector map of the area.

Another embodiment provides a system for producing a vector map of a prescribed area having: a production unit for producing orthophotographs by means of a first camera that is oriented at right angles to the Earth's surface and that is fitted to an unmanned, automated aircraft that overflies the prescribed area at a high altitude; an evaluation unit for evaluating the orthophotographs in order to ascertain at least one infrastructure network located in the area; a first computation unit for computing a flight route for the unmanned autonomous aircraft along the ascertained infrastructure network located in the area; a production unit for producing detail aerial photographs of the infrastructure network along the computed flight route by means of a second camera that is oriented obliquely with respect to the Earth's surface and that is fitted to the unmanned automated aircraft that overflies the infrastructure network located within the area at least one low altitude; and a second computation unit for computing the vector map of the area on the basis of the orthophotographs produced and the detail aerial photographs produced.

BRIEF DESCRIPTION OF THE DRAWINGS

Example aspects and embodiments of the invention are explained in more detail below with reference to the appended figures, in which.

DETAILED DESCRIPTION

Embodiments of the present invention provide a method for producing a vector map that avoids the aforementioned disadvantages and particularly delivers a vector map having a high level of accuracy given simultaneously low manual handling complexity.

Some embodiments provide a method for producing a vector map of a prescribed area having the steps of:

production of orthophotographs by a first camera that is oriented essentially at right angles to the Earth's surface and that is fitted to an unmanned, automated aircraft that overflies the prescribed area at a high altitude;

evaluation of the orthophotographs in order to ascertain at least one infrastructure network located in the area;

computation of a flight route for the unmanned autonomous aircraft along the ascertained infrastructure network located in the area; production of detail aerial photographs of the infrastructure network along the computed flight route by a second camera that is oriented obliquely with respect to the Earth's surface and that is fitted to the unmanned automated aircraft that overflies the infrastructure network located in the area at least one low altitude, and computation of the vector map of the area on the basis of the orthophotographs produced and the detail aerial photographs produced.

One possible advantage is that production and manual evaluation of the detail aerial photographs becomes largely superfluous.

A further possible advantage is that a vector map can be produced in a very short time in largely automated fashion.

In one embodiment of the method, attribute data are extracted from the detail aerial photographs produced for the infrastructure network and georeferenced. In one possible embodiment of the method according to the invention, nodes and/or edges of the infrastructure network presented in the aerial photographs are provided with the georeferenced attribute data.

In a further embodiment of the method, the nodes and/or edges provided with attribute data are compiled to form the vector map of the area.

In a further embodiment of the method, the orthophotographs produced at the high altitude have distortion eliminated and are georeferenced.

In a further embodiment of the method, the orthophotographs and/or the detail aerial photographs are each produced in different spectral frequency ranges.

In one embodiment of the method, the ascertained infrastructure network is a traffic network, particularly a road or rail traffic network.

In a further embodiment of the method, the ascertained infrastructure network is a supply network, particularly a power supply network or water supply network.

Other embodiments provide an unmanned autonomous aircraft having the features specified herein.

Some embodiments provide an unmanned autonomous aircraft for providing aerial photographs for producing a vector map of a prescribed area having: a first camera that is oriented essentially at right angles to the Earth's surface and that delivers orthophotographs of the prescribed area at a high altitude of the aircraft, and having a second camera that is oriented obliquely with respect to the Earth's surface and that delivers detail aerial photographs of an infrastructure network located in the prescribed area along a computed flight route at a low altitude; wherein the flight route of the unmanned automated aircraft along the infrastructure network is computed automatically on the basis of the orthophotographs delivered by the first camera.

In one embodiment the unmanned automated aircraft has a computation unit that computes the flight route along the infrastructure network located in the area on the basis of the orthophotographs delivered by the first camera.

In a further embodiment the unmanned automated aircraft has a communication interface that the unmanned automated aircraft uses to wirelessly communicate with a base station bidirectionally.

In a further embodiment the base station has a computation unit that evaluates the orthophotographs received via the communication interface of the unmanned automated aircraft in order to compute a flight route along the infrastructure network and subsequently transmits the computed flight route to the unmanned automated aircraft.

In a further embodiment the unmanned automated aircraft has a GPS unit for recording a current position of the aircraft over the area and for georeferencing the orthophotographs and detail aerial photographs delivered by the two cameras.

In a further embodiment the unmanned automated aircraft further has an altitude measuring unit for recording the altitude of the aircraft.

In a further embodiment the unmanned automated aircraft has a flight control unit that steers the unmanned automated aircraft along the computed flight route at the low altitude over the area.

In a further embodiment the aircraft contains a rotor drive unit that is actuated by the flight control unit of the aircraft.

In a further embodiment the computation unit of the unmanned automated aircraft extracts attribute data from the detail aerial photographs delivered at the low altitude by the second camera, which attribute data are subsequently georeferenced.

In a further embodiment the computation unit of the base station linked via the communication interface of the unmanned automated aircraft extracts attribute data from the detail aerial photographs delivered at the low altitude by the second camera, which attribute data are subsequently georeferenced.

In a further embodiment the computation unit of the unmanned automated aircraft or of the base station linked via the communication interface of the unmanned automated aircraft provides the nodes and/or edges of the infrastructure network that are presented in the orthophotographs with the attribute data extracted from the detail aerial photographs and georeferenced and compiles the nodes and/or edges provided with the attribute data to form the vector map of the area.

Other embodiments provide a system for producing a vector map of a prescribed area, the system having:

a device for producing orthophotographs by means of a first camera that is oriented at right angles to the Earth's surface and that is fitted to an unmanned, automated aircraft that overflies the prescribed area at a high altitude;

an evaluation unit for evaluating the orthophotographs in order to ascertain at least one infrastructure network located in the area;

a first computation unit for computing a flight route for the unmanned autonomous aircraft along the ascertained infrastructure network located in the area;

a production unit for producing detail aerial photographs of the infrastructure network along the computed flight route by means of a second camera that is oriented obliquely with respect to the Earth's surface and that is fitted to the unmanned automated aircraft that overflies the infrastructure network located in the area at least one low altitude; and a second computation unit for computing the vector map of the area on the basis of the orthophotographs produced and the detail aerial photographs produced.

Figure 1:
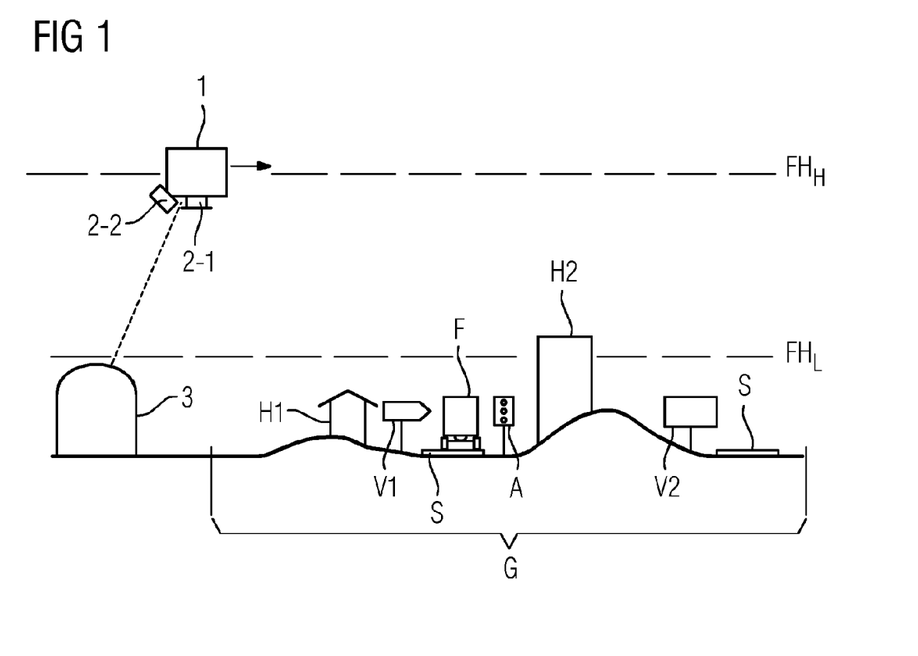
FIG. 1 shows a schematic illustration to illustrate an exemplary embodiment of a system according to one embodiment of the invention for producing a vector map of a prescribed area.

FIG. 1 schematically shows an exemplary embodiment of a system according to one embodiment of the invention for producing a vector map in which the disclosed method is used. The disclosed method is used to produce a vector map of a prescribed area. The area may be any area of the earth or of another planet. The area can contain a wide variety of objects of an infrastructure network.

The infrastructure network is a traffic network or a supply network, for example. The traffic network is a road or rail traffic network, for example. The supply network may be a water supply network or a power supply network, for example. The infrastructure networks comprise nodes and/or edges. By way of example, a road traffic network contains nodes, for example junctions, and edges, particularly roads or paths. Some of the objects of the infrastructure network are provided with signs, for example road signs. These road signs may be road sign symbols, which denote cul-de-sacs or priority roads, for example, or name plates. The name plates indicate the name of the particular town at town entrances, for example. In addition, road signs at vehicle junctions indicate road names. Along the edges of the infrastructure network, there may be various objects, for example road signs, traffic control facilities, particularly traffic lights or the like, and also residential and work buildings. The buildings established along the edge or road have house numbers, where, typically, buildings on a first side of the road are provided with even house numbers and buildings on the opposite, second side of the road are provided with odd house numbers. The front door numbers normally increase linearly along the edge or road. The objects of the infrastructure network that are located in the traffic and the objects adjoining or adjacent thereto are located on the ground or on the Earth's surface and have different heights or physical heights. As such, traffic control facilities, for example traffic lights or road signs, normally have a height of less than 10 m. The buildings located on the road may have different heights, with residential buildings normally having a height of less than 20 m, while multistory buildings can also have heights of over 100 m. In addition, there may even be mobile objects, particularly road vehicles or rail vehicles, on and in the infrastructure network.

FIG. 1 shows a highly simplified and exemplary view of an unmanned automated aircraft 1 that is used in the system according to one embodiment of the invention and that overflies a prescribed area G at a high altitude $FH_H$, said area being able to contain various objects of at least one infrastructure network. These objects are located on the earth's or planet's surface in a prescribed area G. In the example shown in FIG. 1, a vehicle F, as a mobile vehicle, travels on a first road S that leads to a junction at which a road sign V1 is installed and instructs the driver of the vehicle F to turn in a direction. Furthermore, there is a set of traffic lights A as an object at the junction or node. A further road sign V2 bearing the name of a locality is located on a further road S. Further objects shown along the road are a private house H1 and a multistory building or apartment building H2. The roads S shown in FIG. 1 each form an edge within a traffic infrastructure network and connect two nodes of the traffic infrastructure network, for example two junctions, to one another. On the basis of the objects that are present on the road or edge, particularly the road signs V1, V2, it is possible to obtain attribute data or supplementary data. In addition, it is possible to obtain further attribute data from the further objects that are present on the roads S or edges, for example buildings or traffic lights or traffic control facilities. Letters or characteristics that are on road signs, name plates or the like can be automatically recognized in order to produce appropriate attribute data.

As FIG. 1 shows, the unmanned automated aircraft 1 has two cameras 2-1, 2-2. The first camera 2-1 is preferably oriented essentially at right angles to the Earth's surface. In one possible embodiment, the first camera 2-1 is a wide-angle camera. This first camera 2-1 is suitable for taking orthophotographs of the area from a high altitude $FH_H$. The unmanned autonomous aircraft 1 further has a second camera 2-2 that is oriented obliquely with respect to the Earth's surface. The second camera 2-2 is suitable for delivering detail aerial photographs of the infrastructure network from at least one relatively low altitude $FH_L$.

In one possible embodiment, the high altitude $FH_H$ is in a range from 300 to 2000 m. Depending on the application, the low altitude $FH_L$ is in a range from 0 up to an adjustable maximum value of 250 m, for example. In one possible embodiment, the low altitude $FH_L$ is chosen such that it is above the height of the highest object located within the area G. In the example shown in FIG. 1, the altitude $FH_L$ is at least the height of the high office building H2. In an alternative preferred embodiment, the altitude $FH_L$ is chosen independently of the height of the objects located in the area G such that the detail aerial photographs that are delivered by the second camera 2-2 provide such a high resolution that attribute data from the infrastructure network can be easily extracted.

In some embodiment, the disclosed method and system involve orthophotographs being produced by the first camera 2-1 oriented at right angles to the Earth's surface, the camera 2-1 being installed on the unmanned automated aircraft 1 that overflies the prescribed area G at the high altitude $FH_H$. The orthophotographs produced are first of all evaluated in order to ascertain at least one infrastructure network located in the area G. By way of example, this infrastructure network is a traffic network, particularly a road traffic network or a rail traffic network. In addition, the infrastructure network may be a supply network, for example a power supply network or a water supply network.

Following evaluation of the orthophotographs, a flight route for the unmanned autonomous aircraft 1 along the ascertained infrastructure network located in the area G is computed. As soon as the flight route along the ascertained infrastructure network has been computed, the unmanned automated aircraft 1 reduces its altitude and overflies the area G along the computed flight route at least one low altitude $FH_L$. In this case, the second camera 2-2, which is oriented obliquely with respect to the Earth's surface, delivers detail aerial photographs of the infrastructure network along the computed flight route. On the basis of the orthophotographs produced by the first camera 2-1 and the detail aerial photographs produced by the second camera 2-2, the vector map of the area G is finally computed. This involves attribute data being extracted from the detail aerial photographs of the infrastructure network that are delivered by the second camera 2-2 and being georeferenced. Nodes and/or edges of the infrastructure network presented in the orthophotographs are provided with the georeferenced attribute data. The orthophotographs provided with the attribute data are subsequently compiled to form the vector map of the area G. In one possible embodiment, the orthophotographs produced at the high altitude $FH_H$ first of all have distortion eliminated and are subsequently georeferenced. The distortions in a photographic central projection that arise in the orthophotographs and also distortions as a result of height differences in the terrain or on account of the earth's curvature are preferably orthoreferenced by means of optical projection methods. In one possible embodiment, digital photographs are converted on the basis of digital terrain models and georeferenced on the basis of points with known coordinates. In the case of the photographs or orthoimages produced from orthophotographs or vertical photographs, the regions close to the image center are preferably used, since they are distorted less than points situated further away from the projection center. In this case, the distortion becomes all the smaller the higher the camera 2-1 is above the terrain G. The remainder of the images preferably have distortion eliminated such that the geometry corresponds everywhere to the scale prescribed in a map in an orthogonal outline projection. The camera 2-1 is preferably oriented perpendicularly downward. In addition, the unmanned autonomous aircraft 1 is preferably controlled such that it makes no tilting movements during production of the orthophotographs. In addition, distortions that arise as a result of terrain height differences are preferably removed. This can be accomplished using a height data model that is available for the terrain.

In one possible embodiment, the orthophotographs from the first camera 2-1 and the detail aerial photographs from the second camera 2-2 are produced in the same spectral frequency range, for example in a visible range. In an alternative embodiment, the orthophotographs and the detail aerial photographs are produced in different spectral frequency ranges, for example in the visible and infrared ranges.

In one possible embodiment, the first flight route of the unmanned automated aircraft 1 at the high altitude $FH_H$ in order to produce the orthophotographs is computed by a computation unit of the aircraft 1. Alternatively, the first flight route for producing the orthophotographs can be computed by a server of a base station 3 and transmitted to the aircraft 1 via a wireless interface. In addition, the second flight route of the unmanned autonomous aircraft 1 at the low altitude $FH_L$ in order to produce the detail aerial photographs can, in one possible embodiment, be provided by a computation unit of the unmanned automated aircraft 1. Alternatively, the flight route for producing the detail aerial photographs is computed by a server or a computer unit of the base station 3 that transmits the computed flight route for producing the detail aerial photographs to the aircraft 1 via a wireless radio interface. In one possible embodiment, the unmanned automated aircraft has a mobile radio interface in order to interchange data with the base station 3 bidirectionally.

In one possible embodiment, the area G for which a vector map is intended to be produced is first of all stipulated. Subsequently, the infrastructure network(s) that need(s) to be recorded is/are determined or stipulated. By way of example, it is stipulated that the vector map is intended to reproduce a road traffic network within the area G. In one possible embodiment, the vector map can also reproduce multiple different infrastructure networks, for example a road traffic network and a power supply network. As soon as the area G and the infrastructure network have been stipulated already available map material can be taken as a basis for computing a first flight route for producing orthophotographs. The computed first flight route can be stored in a data memory to which a flight controller of the aircraft 1 has access. Subsequently, the unmanned autonomous aircraft 1 rises from the ground and overflies the area G at the high altitude $FH_H$ along the computed first flight route in order to produce orthophotographs from a great height using the first camera 2-1 oriented essentially at right angles to the Earth's surface. The orthophotographs have distortion eliminated and are compiled to form an overall image, with the current position of the aircraft 1 being continuously recorded and the orthophotographs being automatically georeferenced. Subsequently, the orthophotographs are evaluated either directly by a computation unit of the unmanned automated aircraft 1 or by a central server that is located in a base station 3, for example. Image analysis can be used to identify essential structures, particularly vegetation, buildings or roads running through the area, and to convert the infrastructure network into vector data. Subregions can be identified and corresponding boundaries, for example a city limit, can be ascertained.

In a further step, the identified infrastructure network, for example a road network, is used to compute a further flight route using a computation unit that contains all the necessary nodes and edges of the infrastructure network. By way of example, the second flight route comprises all the roads and junctions in a road traffic network within the area G. As soon as the second flight route has been computed, the unmanned automated aircraft 1 changes from the high altitude $FH_H$ to the low altitude $FH_L$ and overflies the area G at least one low altitude. In this case, the second camera 2-2, along the computed low flight route, records details of objects of the infrastructure network from a bird's eye perspective. In one possible embodiment, the detail aerial photographs produced are transmitted via a wireless interface of the aircraft 1 to a server of a base station 3, where they are evaluated. Alternatively, the detail aerial photographs are evaluated directly by a computation unit within the aircraft 1, preferably in real time. The evaluation of the detail aerial photographs involves attribute data being extracted from the detail aerial photographs of the infrastructure network and georeferenced. In one possible embodiment, the intervals of time between the time of production of the orthophotographs and the time of production of the detail aerial photographs are minimized or kept short in order to reduce errors or discrepancies. In one possible embodiment, the area G is first of all divided into subareas and the method is performed for each subarea, with the aircraft 1 changing between the high altitude $FH_H$ and the low altitude $FH_L$ for each subarea.

To correct known vector data, the disclosed method and the orthophotographs produced can first of all be used to check a match for the existing vector data and to perform a correction if discrepancies exist. On the basis of these data or the already available data, the flight route can be computed and the data capture can be performed.

In one embodiment of the method, locally used aircraft may be linked to a central planning and data capture system. In this embodiment, different aircraft 1 can be used for different areas. The central planning and data capture system records the positions for the unmanned automated aircraft 1 used in different areas and, in one possible embodiment, computes the flight routes of the aircraft 1. In addition, the central planning and data capture system can receive the captured geodata from the different aircraft 1, which, in one possible embodiment, have their plausibility checked. The data whose plausibility has been successfully checked are subsequently transferred or transmitted as valid data to the global map inventory of the planning and data capture system.

In one possible embodiment, the position of the aircraft 1 and a date of a last inspection flight are taken into account for computing the flight routes to be flown. In one possible embodiment, the central planning and data capture system also has access to action planning data, for example to action planning data from road construction offices or similar sites. From these data sources, the planning and data capture system can obtain information or data concerning what sites within the area G are currently undergoing alterations in the infrastructure network, for example the road network, and what sites have already had road construction measures completed. In a further possible embodiment, to verify the captured data and to check the currentness of the data, it is possible for test flight routes to be computed that are flown by means of the unmanned autonomous aircraft 1, the aerial photographs produced in this case being able to be transmitted to a central server of the base station 3. In contrast to verification by means of conventional vehicles and test drivers, this requires no manual control. Deviations in the data from the captured reality do not affect safety, since the aircraft 1 is not tied to roads or compliance with road traffic rules.

In one embodiment, the unmanned autonomous aircraft 1 used in the disclosed system can perform further tasks or services, particularly if production of vector maps is not necessary at this time or has lower priority. By way of example, the unmanned autonomous aircraft 1 can be changed over from a mode of operation for producing a vector map to a different mode of operation in which it performs a different function. The unmanned autonomous aircraft 1 can be changed over between different modes of operation by a control signal that is transmitted to the unmanned autonomous aircraft 1 by the base station 3, for example, via a wireless interface. If a queue is identified within the area in a traffic network, for example, the unmanned aircraft 1 that is currently capturing data for a vector map can be changed over to a different mode of operation in which it helps to identify the cause of the queue or to optimize the flow of traffic within the infrastructure network. In addition, the unmanned aircraft 1 can further be changed over to a mode of operation in which it accompanies an object within the area G, for example a heavy truck, along the infrastructure network at a low altitude $FH_L$. While the unmanned autonomous aircraft 1 accompanies the object, for example a vehicle F that moves on a road S within the area G, it can additionally transmit aerial photographs or data to a base station 3, these then being able to be evaluated to increase safety for the movement of the vehicle F along the road S. While the unmanned autonomous aircraft 1 accompanies the mobile object, for example the vehicle F, within the area G, it can additionally produce aerial photographs to produce or verify a vector map using its cameras 2-1, 2-2.

Further possible services performed by the aircraft 1 are securing evidence in the case of accidents or identifying cold bridges and weak spots in buildings by means of a thermal imaging camera. The different tasks and services can have different priorities. In one possible embodiment, the tasks performed by the aircraft 1 are prioritized on the basis of the priorities assigned to the tasks and services and the current position of the aircraft 1.

Figure 2:
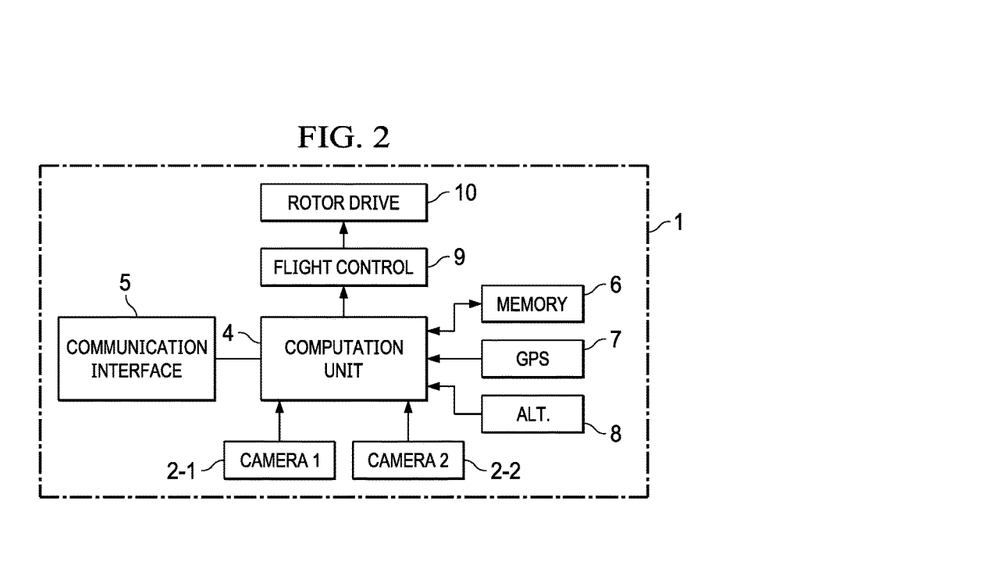
FIG. 2 shows a block diagram of an exemplary embodiment of an unmanned automated aircraft that is used in the disclosed systems and methods.

FIG. 2 shows a block diagram of a possible exemplary embodiment of an unmanned autonomous aircraft 1 used in the disclosed system and method. The aircraft 1 has a first camera 2-1 that delivers orthophotographs of the prescribed area G at a high altitude $FH_H$.

By way of example, the first camera 2-1 may be a wide-angle camera. The camera 2-1 is preferably oriented essentially at right angles to the Earth's surface. The unmanned autonomous aircraft 1 further has a second camera 2-2 that delivers detail aerial photographs of an infrastructure network located in the prescribed area G along a computed second flight route at low altitude. In one preferred embodiment, the oblique orientation of the second camera 2-2 relative to the Earth's surface can be set during operation of the aircraft 1. By way of example, the angle between the aircraft 1 flying in the horizontal direction and an object of the infrastructure network that is located on the ground can be set by moving the second camera 2-2 during flight. The flight route of the unmanned automated aircraft 1 along the infrastructure network, for example the road network, is computed automatically on the basis of the orthophotographs delivered by the first camera 2-1. In one possible embodiment of the aircraft 1, it has a computation unit 4 that computes the flight route along the infrastructure network located in the area G on the basis of the orthophotographs delivered by the first camera 2-1. In the embodiment shown in FIG. 2, the aircraft 1 further has a communication interface 5 that the unmanned automated aircraft 1 uses to wirelessly communicate with the base station 3 bidirectionally. In one possible embodiment, the communication interface 5 is a mobile radio interface.

In one possible embodiment, the base station 3 has a computation unit or a server that evaluates the orthophotographs received via the communication interface 5 of the unmanned automated aircraft in order to compute a flight route along the infrastructure network and transmits the computed flight route back to the unmanned automated aircraft 1. The two flight routes, namely the first flight route for producing new orthophotographs and the second flight route for producing the detail aerial photographs, are stored in a data memory 6 in one preferred embodiment. In the embodiment shown in FIG. 2, the aircraft 1 further has a GPS unit 7 for recording a current position of the aircraft 1 over the area G and for georeferencing the orthophotographs and detail aerial photographs delivered by the two cameras 2-1, 2-2. In addition, the aircraft 1 in the exemplary embodiment shown in FIG. 2 has an altitude measuring unit 8 for recording the current altitude of the aircraft 1 over the area G.

The aircraft 1 further contains a flight control unit 9 that steers the unmanned automated aircraft 1 along the computed flight route at the high and/or low altitude over the area G by actuating a rotor drive unit 10 of the aircraft 1 in accordance with the flight route. The rotor drive unit 10 contains an electric motor that drives a rotor having multiple rotor blades. In one possible embodiment, the flight control unit 9 also actuates flight guidance devices, for example actuators that change the direction of flight of the aircraft 1 in accordance with the flight route. In alternative embodiments, the aircraft 1 has other aviation drives, for example engines. Rocket engines are used if there is no air atmosphere. The aircraft 1 can be serviced and loaded centrally or in distributed fashion.

In one possible embodiment, the computation unit 4—shown in FIG. 2—of the unmanned automated aircraft 1 extracts attribute data from the detail aerial photographs delivered at the low altitude by the second camera 2-2 and georeferences said attribute data, for example by means of their position data delivered by the GPS unit 7 or another unit. In an alternative embodiment, the detail aerial photographs delivered by the second camera 2-2 are first of all transmitted via the communication interface 5 to a server of the base station 3, where they are evaluated in order to extract and georeference the attribute data. In a further embodiment of the aircraft 1, the computation unit 4 of the unmanned automated aircraft 1 provides the nodes or edges of the infrastructure network that are presented in the orthophotographs with the attribute data extracted from the detail aerial photographs and georeferenced and compiles the nodes and edges provided with the attribute data to form the vector map of the area G. In an alternative embodiment, the nodes or edges of the infrastructure network that are presented in the orthophotographs are provided with the attribute data, extracted from the detail aerial photographs and georeferenced, by a computation unit 4 of the base station 3, and, subsequently, the nodes and edges provided with the attribute data are compiled by the server or the computation unit 4 of the base station 3 to form the vector map of the area G.

Figure 3:
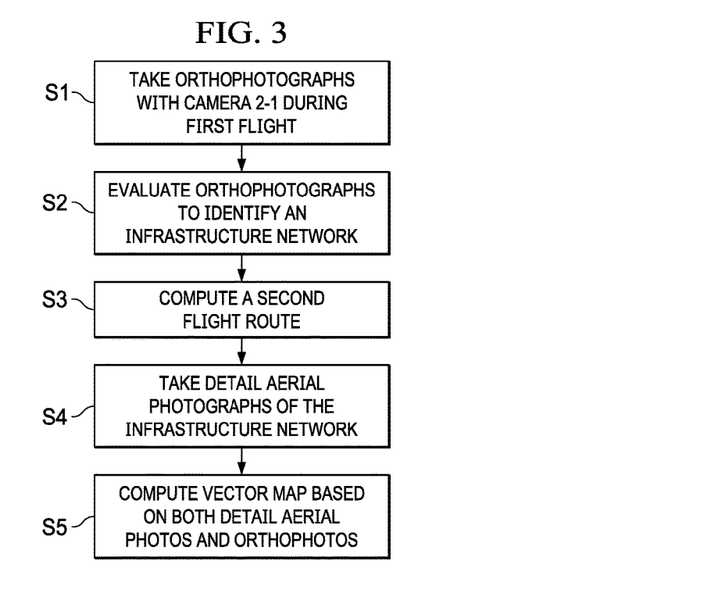
FIG. 3 shows a flowchart to illustrate an exemplary embodiment of the disclosed method for producing a vector map.

FIG. 3 shows a flowchart to illustrate an exemplary embodiment of the method according to one embodiment for producing a vector map.

In a step S1, orthophotographs are first of all produced by a first camera 2-1 that is oriented essentially at right angles to the Earth's surface and that is fitted to an unmanned automated aircraft 1 that overflies the prescribed area G at a high altitude $FH_H$ in accordance with a first flight route.

In a further step S2, the orthophotographs are evaluated in order to ascertain at least one infrastructure network located in the area G.

In a further step S3, a second flight route for the unmanned autonomous aircraft 1 along the ascertained infrastructure network located in the area G is computed.

In a further step S4, detail aerial photographs of the infrastructure network along the computed second flight route are produced by a second camera 2-2 that is oriented obliquely with respect to the Earth's surface and that is likewise fitted to an unmanned automated aircraft 1 that overflies the infrastructure network located in the area G at least one low altitude $FH_L$.

In a further step S5, the vector map of the area G is computed on the basis of the orthophotographs produced and the detail aerial photographs produced.

In one possible embodiment, the method presented in FIG. 3 with the steps S1 to S5 is performed by the unmanned automated aircraft 1 autonomously. In one possible embodiment, the computation unit of the unmanned autonomous aircraft 1 has one or more microprocessors that execute an appropriate control program in order to perform the method according to one embodiment. This program may be located in a program memory of the aircraft 1.

The use of the unmanned automated aircraft 1 affords the particular advantage that recording of the orthophotographs and of the detail aerial photographs can be combined. As a result, the aerial photographs can be correlated with one another or related to one another in automated fashion and without manual handling steps, since the differences between the aerial photographs from the first camera 2-1 and the second camera 2-2 are known in advance. Combination of the data or aerial photographs combined in this manner facilitates automated evaluation of the data.

Further variant embodiments of the method and system are possible. As such, in one possible embodiment, multiple unmanned automated aircraft 1 can be used that fly different subareas of the area G in order to produce aerial photographs. In addition, it is also possible for a first and a second unmanned automated aircraft to be used, the first unmanned automated aircraft overflying the area G at a high altitude $FH_H$, in order to produce the orthophotographs, and the other unmanned automated aircraft overflying the area G at a low altitude $FH_L$, in order to produce the associated detail aerial photographs. The orthophotographs and detail aerial photographs produced can be transmitted to a common base station 3 by the two unmanned automated aircraft 1 flying at different altitudes. In one preferred embodiment, the two unmanned automated aircraft 1 can communicate with one another via a communication interface, so that the two flight routes of the two aircraft 1 can be coordinated with one another. This embodiment affords the advantage that the orthophotographs and the detail aerial photographs can be produced almost simultaneously. A further advantage is that the unmanned autonomous aircraft 1 are able to move essentially at a constant altitude, since there is no need for a change of altitude.

In one possible embodiment, the unmanned automated aircraft 1 overflies the area G in accordance with the computed flight route at an almost constant speed. In one possible embodiment, the unmanned automated aircraft 1 overflies the area G at the low altitude $FH_L$ at a variable speed, which can change on the basis of the objects located in the area G. By way of example, when the unmanned automated aircraft 1 approaches a relevant object along the infrastructure network, for example a road sign V2, it can reduce its speed to record the detail aerial photograph, for example in order to accurately capture lettering on the road sign V2. Characters, particularly letters or numbers, are preferably identified automatically. Further, a plausibility check for the identified characters can take place.

In one possible embodiment, the base station 3 is located at a fixed position, for example in a building. In an alternative embodiment, the base station is located in a vehicle that is positioned at the edge of the area to be recorded or within the area G. This facilitates bidirectional signal transmission between the communication interface 5 of the unmanned automated aircraft 1 and the computation unit 4 or the server of the base station 3.

In a further possible embodiment, computation of the flight route of the unmanned automated aircraft 1 additionally involves accessing weather data of a weather service. By way of example, the high altitude $FH_H$ is set on the basis of cloud formations that are to be expected in the area G. In this case, the unmanned automated aircraft 1 preferably moves below the cloud cover located in the area G. In a further possible embodiment, the unmanned automated aircraft 1 transmits the data from the aerial photographs and other data to the base station 3 not directly but rather via a relay station, for example via a satellite link.

In a further possible embodiment, the unmanned automated aircraft 1 moves at the low altitude $FH_L$ between the objects located in the area G, for example buildings, along the computed flight route, with a collision with objects, for example with houses or buildings, being avoided. To avoid collision, the unmanned automated aircraft 1 may have further sensors, for example radar sensors.

The disclosed methods and systems for producing vector maps can be used in a versatile manner. By way of example, the vector maps can be used for infrastructure planning and/or town planning. In addition, the vector maps can be used in the field of disaster prevention in order to avoid a malfunction in the infrastructure network. By way of example, the system and method according to the invention can be used to monitor water dams in a water protection system. A further area of application is monitoring gas or power lines in a supply network.

The disclosed methods and systems may provide the particular advantage that impassable terrain or impassable areas can also be recorded. In addition, the unmanned autonomous aircraft can overfly the area G almost soundlessly, which means that noise pollution for the occupants in the area G is avoided.

In one embodiment, the unmanned autonomous aircraft alters its altitude within a prescribed admissible altitude range autonomously on the basis of further sensor data that it obtains from sensors. These sensors may be fitted to the unmanned autonomous aircraft 1 or positioned in the prescribed area G.

The area G may also be underwater, the infrastructure network having pipelines, oil lines, drilling facilities and the like, for example. In this case, the aircraft 1 is formed by an unmanned underwater vehicle that charts the seabed in an underwater area.

The invention claimed is:

1. A method for producing a vector map of a prescribed area, the method comprising:
    flying an unmanned, automated air vehicle over the prescribed area at a first altitude at least 300 m above ground level;
    producing digital orthophotographs by a first camera oriented at a right angle to the Earth's surface and fitted to the air vehicle;
    converting the digital orthophotographs on the basis of digital terrain models to georeference the digital orthophotographs on the basis of points with known coordinates;
    evaluating the converted orthophotographs to identify at least one infrastructure network located in the area;
    computing a flight route for the unmanned autonomous aircraft along the ascertained infrastructure network located in the area at a second altitude no more than 250 m above ground level, wherein the flight route is computed based on the converted orthophotographs;
    flying the air vehicle along the computed flight route and producing detail aerial photographs of the infrastructure network with a second camera oriented obliquely with respect to the Earth's surface and fitted to the unmanned automated aircraft, and
    computing the vector map of the area based on the converted orthophotographs and the detail aerial photographs.

2. The method of claim 1, comprising extracting attribute data from the detail aerial photographs produced for the infrastructure network and georeferencing the attribute data.

3. The method of claim 1, comprising associating the georeferenced attribute data with at least one of nodes or edges of the at least one identified infrastructure network.

4. The method of claim 3, comprising compiling the nodes or edges having the associated attribute data to form the vector map of the area.

5. The method of claim 1, wherein the orthophotographs produced at the first altitude have distortion eliminated and are georeferenced.

6. The method of claim 1, wherein the orthophotographs and the detail aerial photographs are produced in different spectral frequency ranges.

7. The method of claim 1, wherein the infrastructure network is a traffic network, a power supply network, or a water supply network.

8. An unmanned autonomous aircraft for providing aerial photographs useful for producing a vector map of a prescribed area, the unmanned autonomous aircraft comprising:

a first camera oriented essentially at right angles to the Earth's surface and configured to capture digital orthophotographs of the prescribed area at a first altitude at least 300 m above ground level; and a second camera oriented obliquely with respect to the Earth's surface and configured to capture detail aerial photographs of an infrastructure network located in the prescribed area along a computed flight route at a second altitude no more than 250 m above ground level;

wherein the flight route of the unmanned automated aircraft along the infrastructure network is computed automatically by:

based on the orthophotographs delivered by the first camera, evaluating the converted orthophotographs to identify at least one infrastructure network located in the area; and automatically computing the flight route using the converted orthophotographs.

9. The aircraft of claim 8, comprising a computation unit that computes the flight route along the infrastructure network located in the area based on the converted orthophotographs.

10. The aircraft of claim 9, comprising:
a GPS unit configured to record a current position of the aircraft over the area and georeference the orthophotographs and detail aerial photographs delivered by the two cameras, and
an altitude measuring unit configured to record the altitude of the aircraft.

11. The aircraft of claim 9, wherein the computation unit of the unmanned automated aircraft or the computation unit of the base station connected via the communication interface of the unmanned automated aircraft extracts attribute data from the detail aerial photographs delivered at the second altitude by the second camera and georeferences said attribute data.

12. The aircraft of claim 11, wherein the computation unit of the unmanned automated aircraft or the computation unit of the base station connected via the communication interface of the unmanned automated aircraft associates attribute data extracted from the detail aerial photographs with at least one of nodes or edges of the infrastructure network, and georeferences and compiles the at least one the nodes or edges having the associated attributed data to form the vector map of the area.

13. The aircraft of claim 8, comprising a communication interface that enables wireless communications between the unmanned automated aircraft and a base station bidirectionally.

14. The aircraft of claim 13, wherein the base station comprises a computation unit that converts and evaluates the orthophotographs received via the communication interface of the unmanned automated aircraft in order to compute a flight route along the infrastructure network and transmits the computed flight route to the unmanned automated aircraft.

15. The aircraft of claim 8, comprising:
a flight control unit that steers the unmanned automated aircraft along the computed flight route over the area, and
a rotor drive unit that is actuated by the flight control unit.

16. A system for producing a vector map of a prescribed area, the system comprising:
a production unit configured to produce orthophotographs using a first camera oriented at right angles to the Earth's surface and fitted to an unmanned, automated aircraft that overflies the prescribed area at a first altitude at least 300 m above ground level;
an evaluation unit configured to evaluate the orthophotographs to identify at least one infrastructure network located in the area;
a first computation unit configured to compute a flight route for the unmanned autonomous aircraft along the ascertained infrastructure network located in the area at a second altitude of no more than 250 m above ground level, wherein the flight route is computed based on the orthophotographs;
the production unit configured to produce detail aerial photographs of the infrastructure network along the computed flight route using a second camera oriented obliquely with respect to the Earth's surface and fitted to the unmanned automated aircraft; and
a second computation unit configured to compute the vector map of the area based on the produced orthophotographs produced and the produced detail aerial photographs.

* * * * *